July 7, 1970     P. A. MULLER     3,519,521
APPARATUS FOR MAKING FILTERING MATERIAL FOR CIGARETTES
Original Filed May 22, 1967     5 Sheets-Sheet 1
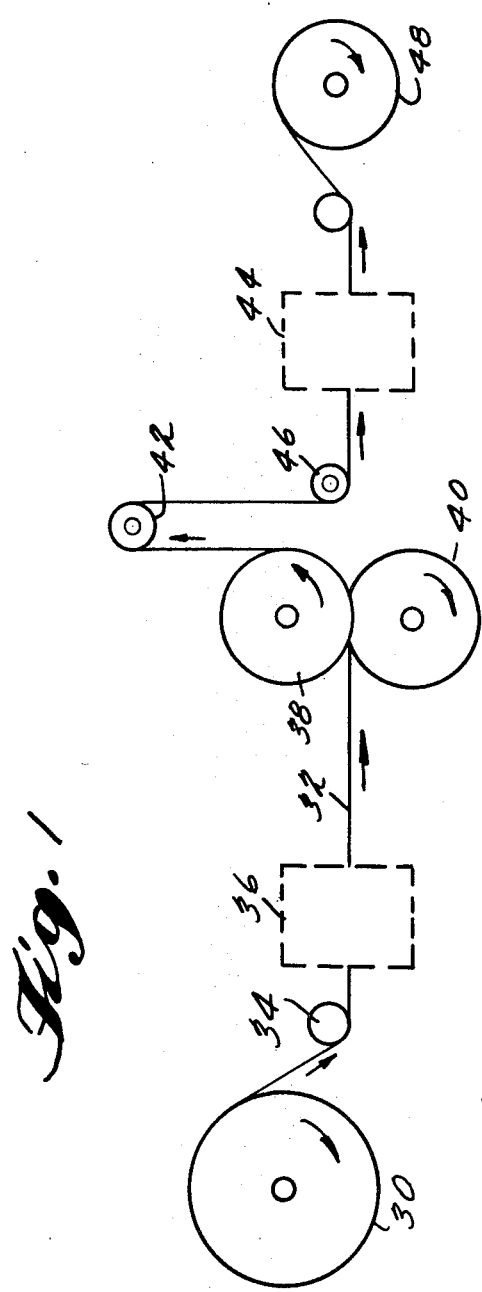
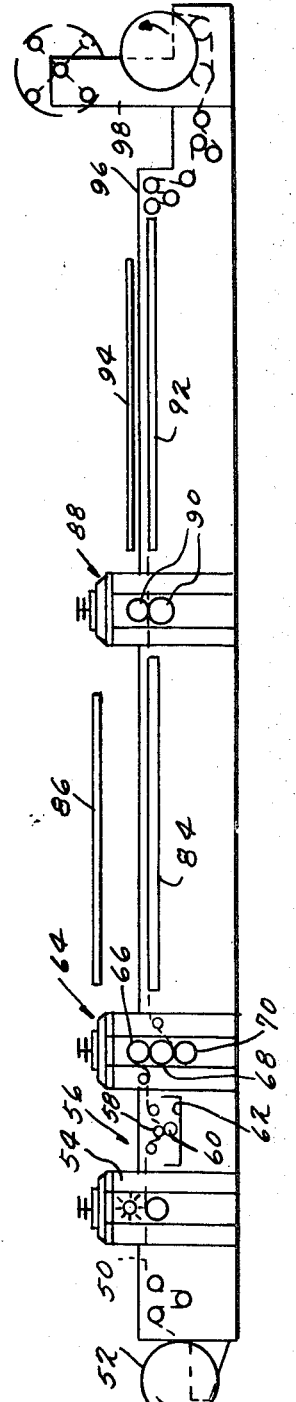
INVENTOR.
PAUL A. MULLER
BY Cushman, Darby & Cushman
ATTORNEYS

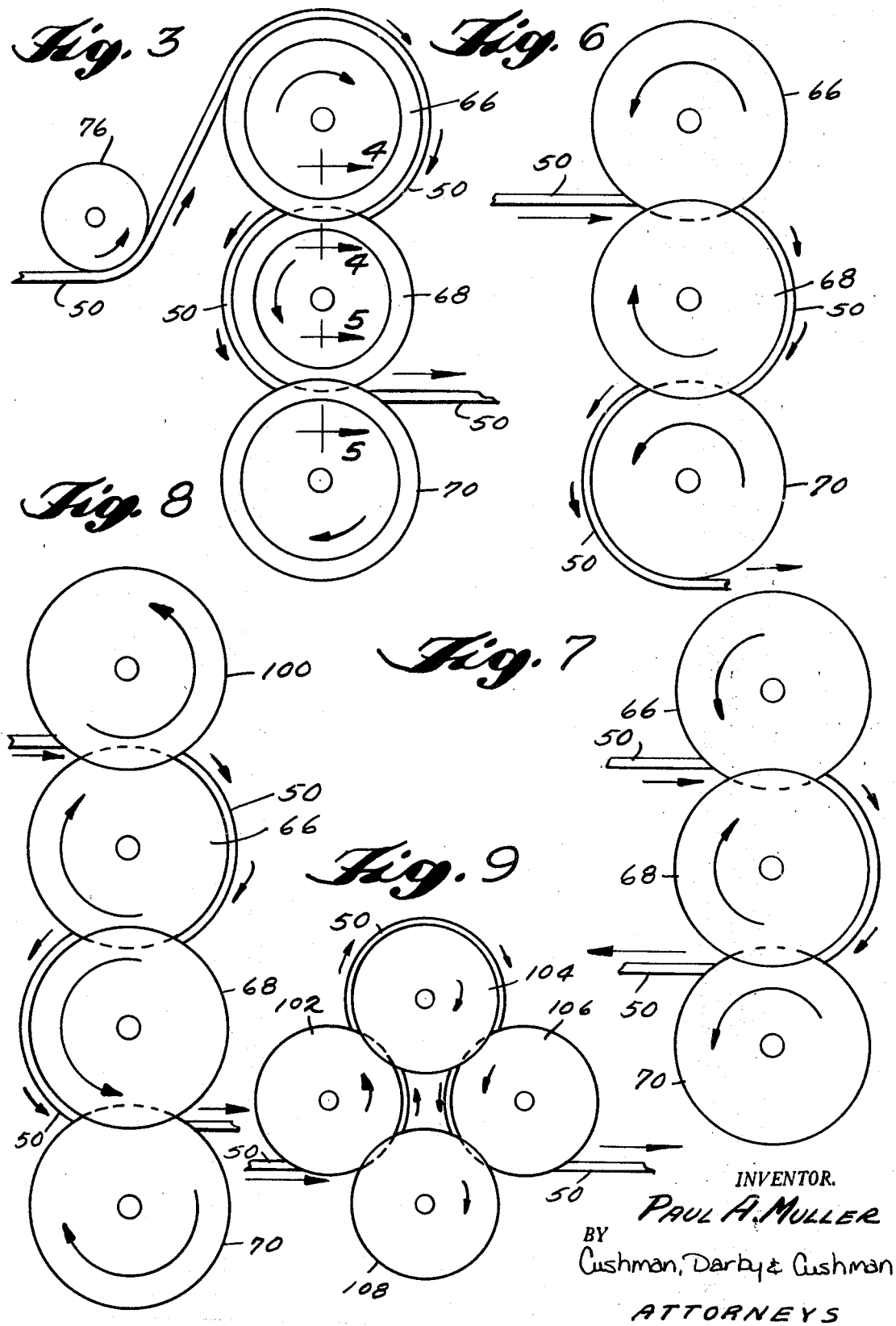

INVENTOR.
PAUL A. MULLER
BY Cushman, Darby & Cushman
ATTORNEYS

United States Patent Office 3,519,521
Patented July 7, 1970

1

3,519,521
APPARATUS FOR MAKING FILTERING
MATERIAL FOR CIGARETTES
Paul A. Muller, Triesenberg, Liechtenstein, assignor to Celfil Company Establishment, Vaduz, Liechtenstein, a corporation of Liechtenstein
Application May 22, 1967, Ser. No. 640,255, now Patent No. 3,466,358, dated Sept. 9, 1969, which is a continuation-in-part of application Ser. No. 841,919, Sept. 2, 1959, which is a division of application Ser. No. 502,016, Apr. 18, 1955, which in turn is a continuation-in-part of application Ser. No. 447,478, Aug. 3, 1954; said application Ser. No. 640,255 is also a continuation-in-part of application Ser. No. 841,918, Sept. 1, 1959, which is a continuation-in-part of application Ser. No. 504,647, Apr. 28, 1955, and is also a division of application Ser. No. 635,470, Jan. 22, 1957. Divided and this application June 19, 1969, Ser. No. 834,791
Int. Cl. B31f *1/00, 1/22, 1/36*
U.S. Cl. 156—592                    5 Claims

ABSTRACT OF THE DISCLOSURE

Apparatus for treating paper to render it particularly adapted to be gathered and enclosed in a wrapper to make a filter cord subdividable into efficient cigarette filters. The paper is first moistened to prevent undue tearing in a longitudinal grooving and lateral stretching treatment, which loosens and exposes fibers, by passage through the nip between heated meshing rollers having alternating circumferential ribs and grooves. Subsequent drying time is shortened by maintaining the web in contact with one of the rollers through an appreciable wrap angle on emergence from the nip. The grooving and stretching treatment may be carried out progressively in successive stages by a train of three or more intermeshing rollers arranged to provide at least two nips therebetween.

RELATED APPLICATION

Figure 4:
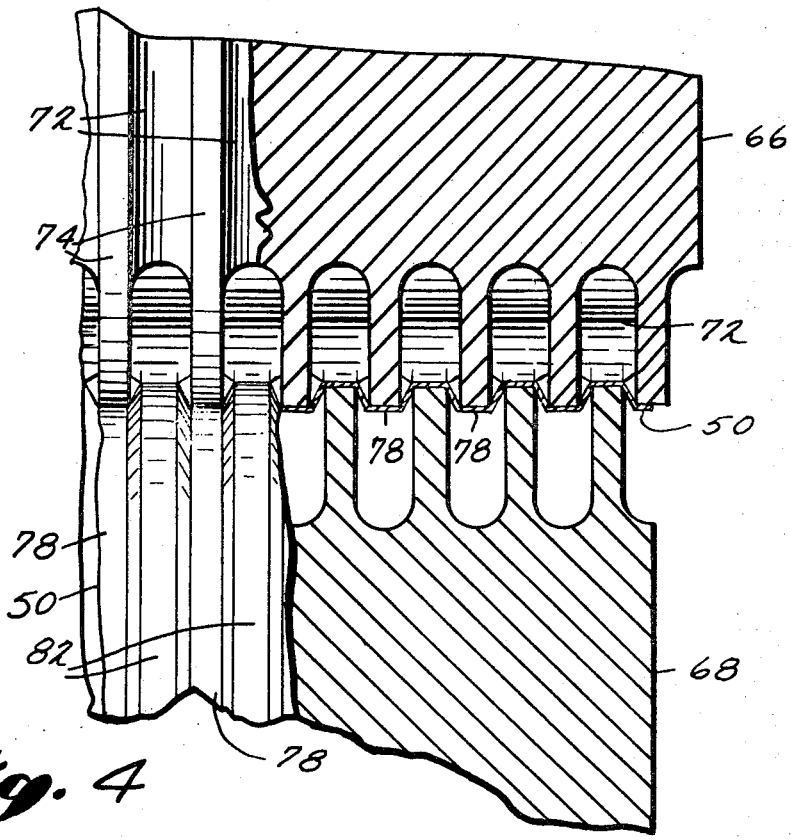

This application is a division of my copending application Ser No. 640,225, filed May 22, 1967, now Pat. No. 3,466,358, which is a continuation-in-part of my co-pending application Ser. No. 841,919, filed Sept. 2, 1959, which is a division of my application Ser. No. 502,016, filed Apr. 18, 1955, now Pat. No. 2,995,481, which was a continuation-in-part of my application Ser. No. 447,478, filed Aug. 3, 1954, now Pat. No. 2,847,086. My said parent application Ser. No. 640,255, now Pat. No. 3,466,358 also is a continuation-in-part of my co-pending application Ser. No. 841,918, filed Sept. 1, 1959, which is a continuation-in-part of my application Ser. No. 504,647, filed Apr. 28, 1955, now Pat. No. 3,161,557, and also a division of my application Ser. No. 635,470, filed Jan. 22, 1957, now Pat. No. 2,916,039.

DISCLOSURE

This invention relates to improvements in the apparatus disclosed in my Pat. No. 2,995,481 for producing filtering material in the form of substantially-continuous longitudinally-grooved or crimped paper webs having loosened and exposed fibers and which are suitable for gathering laterally into a bundle and wrapping to form an endless filter string or cord which is divided into filter rods and filter plugs for cigarettes. That patent discloses the production of such material by first moistening a travelling web of paper, then passing it through the nip between a pair of intermeshing longitudinal grooving and lateral stretching rolls having alternating circumferential grooves and ribs, then drying the web by passage over a heated plate or past a stream of hot air. The patent also discloses the progressive grooving and stretching of a web by passage through the nip between successive pairs of grooving and stretching rolls.

In actual practice of that apparatus, however, progressive grooving and stretching has been found to be impractical because of the difficulty in aligning the grooves formed in the web by a preceding pair of rolls with the lands or ribs of the rolls of the next succeeding pair. Moreover, in actual practice, it has been found to be difficult to increase the production rate, i.e. increase the speed of travel of the web of fibrous material, without also increasing the length of the drying apparatus. Drying of the web is accomplished primarily by exposure to a certain amount of controlled heat for a predetermined period of time. It is self-evident that the heat cannot be too high without danger of damaging the web. Consequently, increases in the speed of the web must be accomplished by increases in length of the drying apparatus in order to maintain proper drying exposure time. Such increases in length result in corresponding increases in cost and floor space.

Accordingly, it is an object of this invention to provide an improved apparatus for progressively longitudinally grooving and laterally stretching a paper web in progressive stages for producing a filtering material.

It is another object of this invention to provide an improved apparatus for drying the previously-moistened grooved and stretched web.

Figure 5:
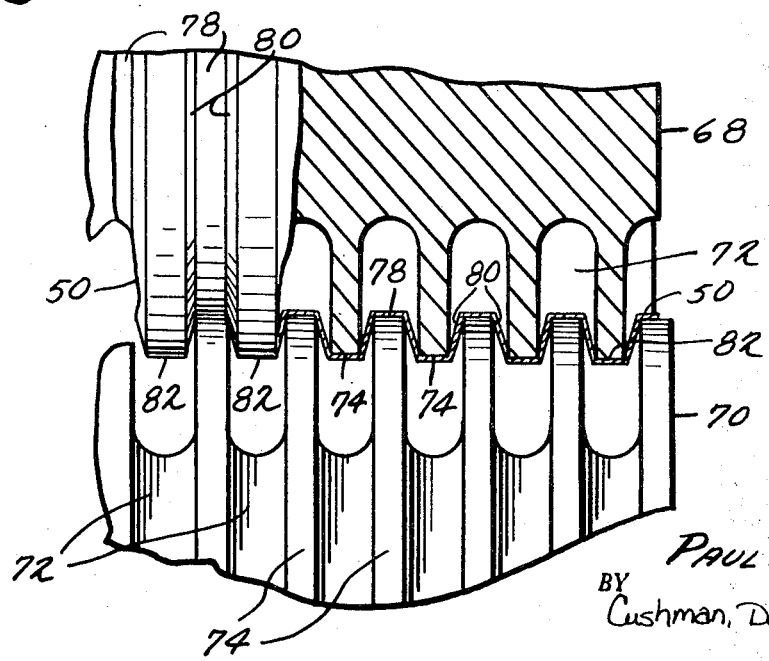
Figure 10:
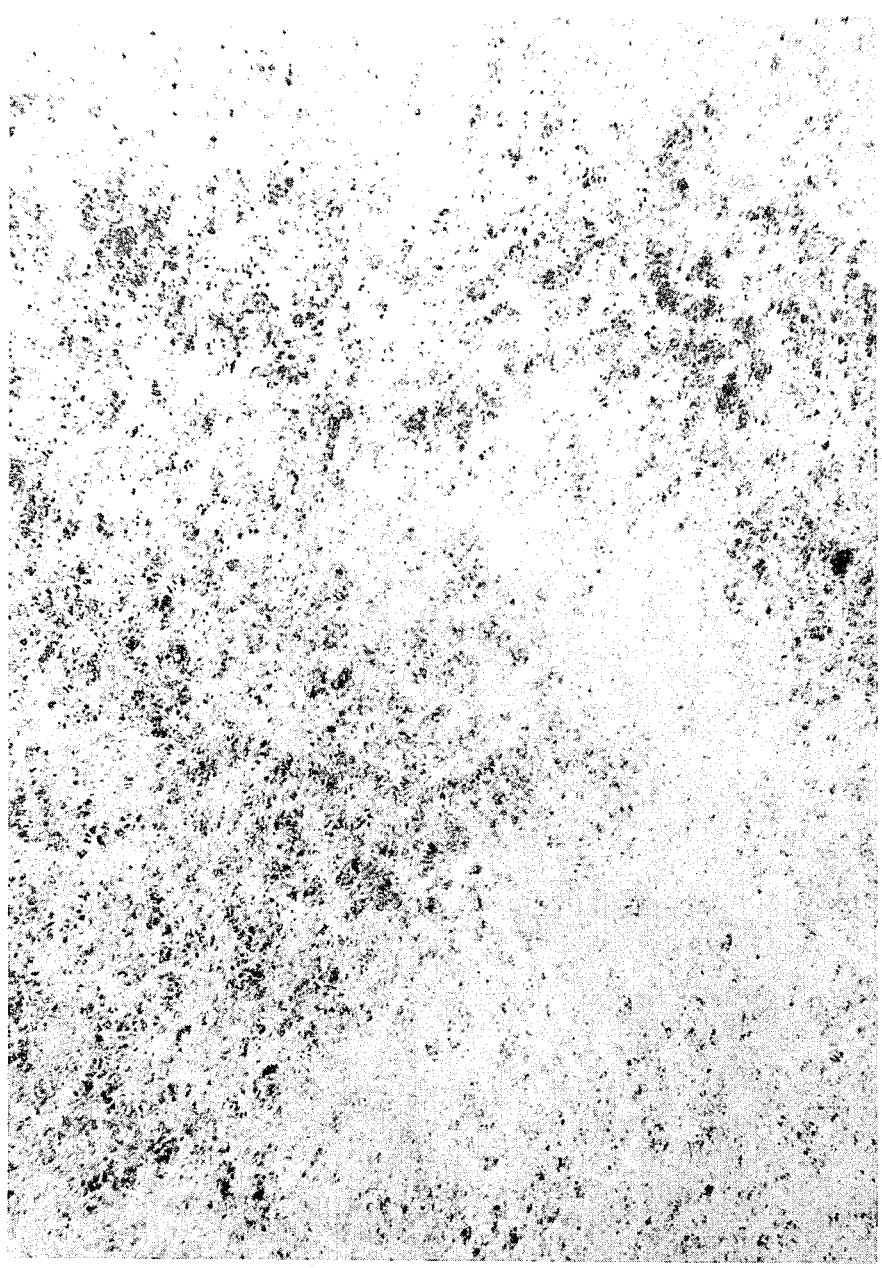
Figure 11:
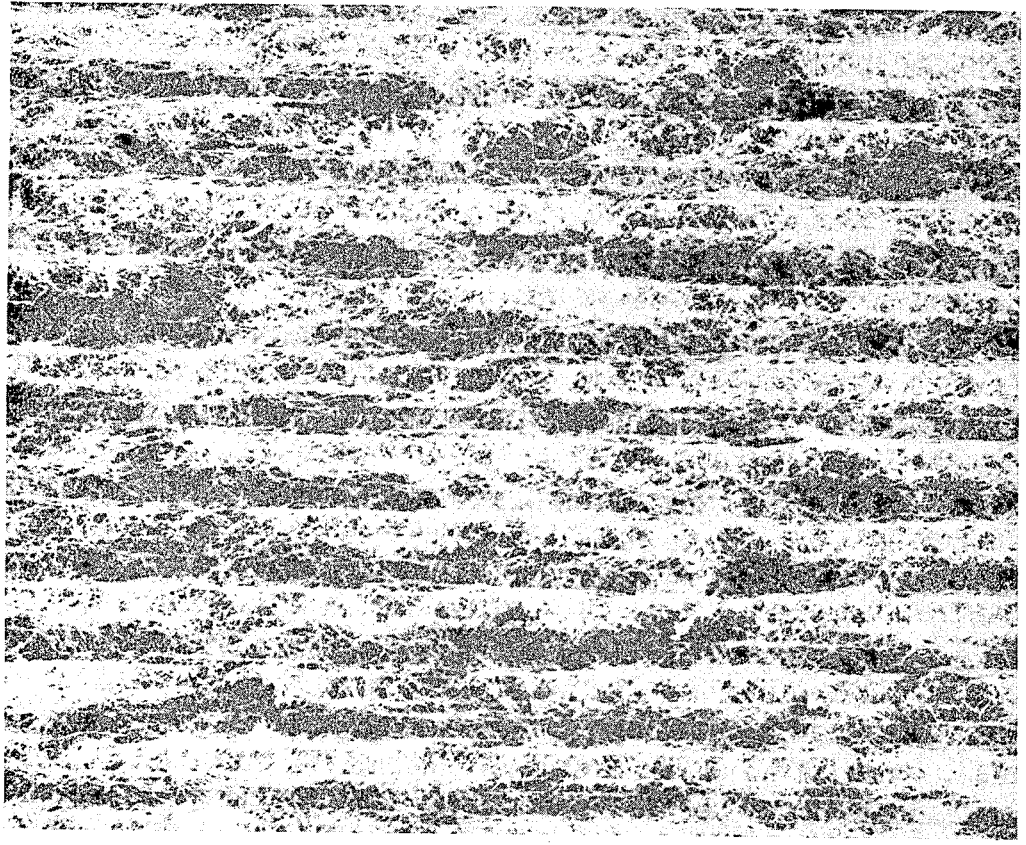
Figure 12:
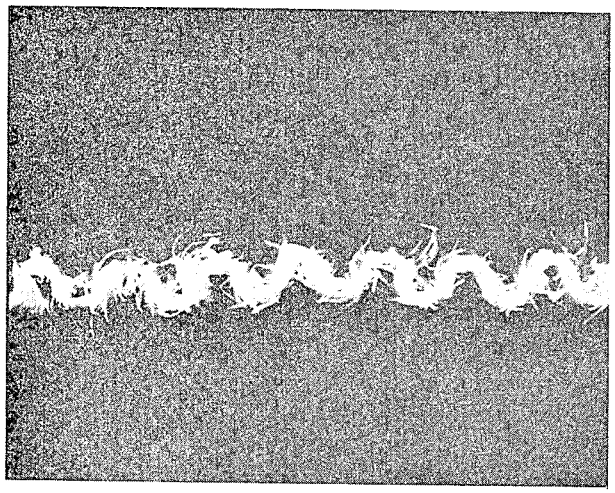

Other objects and advantages of the invention will become apparent from the following description and accompanying drawings in which:

FIG. 1 is a diagrammatic side elevational view of a simplified form of apparatus for practicing this invention, FIG. 2 is a somewhat diagrammatic side elevational view of a modified form of apparatus for practicing this invention, FIG. 3 is an enlarged fragmentary view of a portion of FIG. 2 showing the modified form of grooving and stretching apparatus, FIG. 4 is an enlarged fragmentary view partly in section taken on line 4—4 of FIG. 3, FIG. 5 is an enlarged fragmentary view partly in section taken on line 5—5 of FIG. 3, FIGS. 6 to 9 are views corresponding to FIG. 3 but showing further modified forms of grooving and stretching apparatus for practicing this invention, FIG. 10 is a plan photographic reproduction, enlarged in the ratio of about 100 to 7, of the preferred type of untreated paper for practicing this invention, FIG. 11 is a plan photographic reproduction, enlarged in a ratio of about 100 to 7, showing paper after being treated by the modified form of apparatus shown in FIGS. 2 and 3, FIG. 12 is a cross-sectional photographic reproduction, enlarged in a ratio of 15 to 1, of the paper shown in FIG. 11.

Referring now to FIG. 1 of the drawings, there is shown grooving and stretching apparatus which permits some increase in production rate or operating speed without an accompanying increase in the length of the drying apparatus. In order to simplify a discussion of the apparatus shown in FIG. 1, it has been illustrated without perforating apparatus or deforming apparatus corresponding to the knurling rollers disclosed in my said Pat. No. 2,995,481.

The apparatus consists of a supply roll 30 from which a web 32 of fibrous material is unwound and directed by an idler roller 34 through an appropriate device 36, e.g. a moistening device, for rendering the material yielding. The web 32 then is passed through the nip between a single pair of heated grooving and stretching rollers 38, 40.

It has been found to be particularly desirable that the grooving rollers be adjustably heated, as by suitable interior electrical heaters. Heating of the grooving and stretching rollers not only dries the moistened web somewhat during its passage through the grooving and stretching apparatus, and thus lessens subsequent drying time, but also provides an ironing effect on the web 32, particularly on those narrow strip portions of the web which actually contact the lands or ribs of the grooving rollers. Such an ironing effect appears to lessen or even minimize the tearing or stretching of the web at the ironed areas, and thus provides in the finished product parallel narrow longitudinal zones or strips at the bottoms of the grooves or at the edges thereof where the strength of the material is not unduly unimpaired by the stretching process. This contributes considerably to a desirable tensile strength in the web.

Rollers actually used and found to be effective for grooving and laterally stretching fibrous material have circumferential grooves provided with generally-flat side wall surfaces disposed in planes transverse to the roller axis, and ribs or lands which, in axial section, have a generally-straight configuration parallel to the roller axis. The grooves in each such rollers are 0.027" (0.7 mm.) wide, while the surface of each rib or land is 0.012" (0.3 mm.) wide. The depth of the grooves is sufficient to permit adjustable intermeshing of the rollers to an extent somewhat greater than at least about 0.027" (0.7 mm.). Since paper normally used in practicing the process of this invention has an average thickness of the order of 0.07 mm., it will be seen that the centered clearance, of the order of 0.2 mm., between the sides of the grooves and lands of the meshing rollers is ample to avoid actual cutting or tearing of the web into separate individual strips while at the same time, the dimensions of the grooves and lands are small enough to frictionally engage the paper and substantially prevent any transverse shrinkage thereof during the grooving process.

After emerging from the nip between the grooving and stretching rollers 38, 40, the grooved and stretched material 32 is guided, as by an idler roller 42, so that it continues to be in contact with one of the grooving and stretching rollers, here shown as the upper roller 38, throughout what may be termed a wrap angle of considerable extent, here shown as of the order of 90°. Thus, the grooved and stretched web 32 has a prolonged period of contact with the heated roller 38, particularly with the lands or ribs thereof. Because of this prolonged period of contact the heated roller 38 has a decided drying effect on the grooved and stretched web 32. This serves to eliminate a considerable amount of the moisture content of the web, and renders it unnecessary to increase the length of subsequent drying apparatus 44, through which the web 32 is directed by an idler roller 46 and after which the web is wound up on a spool 48, in order to achieve production rates or speeds of operation greater than those which can be achieved with apparatus of the type disclosed in my Pat. No. 2,995,481.

While apparatus of the type shown in FIG. 1 possesses certain advantages over apparatus of the type disclosed in my said patent, even further improvements are possible. As stated before, it has been found that apparatus of the type disclosed in my said Pat. No. 2,995,481 for grooving and stretching a web in successive stages, i.e. by successive pairs of grooving and stretching rollers, is not satisfactory in actual practice. Even if the dimensions of all of the rollers, including the dimensions for their grooves and ribs, are identical, it is difficult to register the lands of each successive pair of rollers with the grooves formed in the paper by the preceding pair of rollers because of the small dimensions involved. In view of this difficulty, grooving and stretching in successive stages by successive pairs of rollers has not been very practical from a commercial standpoint.

Grooving and stretching with only one pair of single-stage grooving rollers, however, seems to have an impact effect on the paper which tends to break or tear the individual fibers apart. Grooving and stretching rollers having groove and land dimensions of the order of those mentioned heretofore and which have been in actual commercial use, have had a land or rib diameter of the order of about 7.6 inches, which is equal to a circumference of about 23.6 inches. Commercial machines equipped with grooving and stretching rollers of those diameters have been operated at production speeds, i.e. rates of travel of the web, of the order of about 50 inches per second. Since paper travelling between the nip of grooving and stretching rollers of the aforesaid diameters constantly contacts the interfitting ribs or lands through a longitudinal length of the paper of about 0.5" to about 1.0", when operating at the aforesaid speed of about 50" per sec. each increment of the travelling web contacts the interfitting ribs for a time interval of the order of from about 0.01 to about 0.02 second. Such a short contact time with the grooving and stretching rollers seems to have the aforedescribed impacting effect which tends to break or tear the individual paper fibers apart.

By increasing the length of the drying apparatus, or by using an extended grooving-roller-contact path for the travelling web as shown in FIG. 1, higher operating speeds of machines embodying this invention having single-stage grooving apparatus are possible but still result in tending toward too vigorous a tearing effect on the web. It is undesirable to laterally stretch the web so vigorously that the longitudinal cracks and tears therein become unduly long or that the paper is torn into narrow substantially separate individual strips. Such results impair, if not destroy, the transverse continuity of the web, which makes for some difficulty in subsequent handling, both in winding onto and unwinding from storage spools or bobbins and in feeding to a filter-rod-making machine.

The foregoing disadvantages attendant single-stage grooving and stretching and attendant linear passage through the nip of a pair of grooving and stretching rollers without contact with one of said rollers through a considerable wrap angle, are overcome, as well as additional advantages provided, by the modified form of apparatus disclosed in FIGS. 2 to 5.

Referring first to the diagrammatic illustration of the complete apparatus shown in FIG. 2, a smooth web of paper 50 is unwound continuously from a supply roll 52 and passed to a first-treating station 54 which is provided with perforating apparatus, of the type disclosed in my Pat. No. 2,995,481, to perforate the travelling web. Preferably the perforating apparatus at the station 54 not only is selectively adjustable to be operative or inoperative, but also adjustable to vary the size and extent of the perforations in the paper.

From the perforating station 54 the web 50 travels through moistening or wetting apparatus 56 of a known type which is adjustable to vary the extent to which the paper is moistened. Such apparatus may comprise an upper metal roller 58 pressing against a smooth-surfaced rubberlike lower roller 60, the lower portion of which dips into a water bath 62. In passing between the nip of such rollers 58, 60, the lower surface of the paper picks up a variable amount of water which is rapidly absorbed into the paper and renders the same yielding. In this connection, it is desirable that in this modified form of apparatus the paper web should be moistened so that the initial elasticity of the paper is substantially eliminated and the paper is extremely limp on entrance into grooving and stretching apparatus 64.

From the moistening device 56 the moistened paper is passed through the grooving and stretching apparatus 64 shown in greater detail in FIGS. 3 to 5 of the drawings. Such apparatus comprises an uninterrupted train of three intermeshing grooving and stretching rollers 66, 68, 70 arranged in stacked formation so that the grooves 72 and lands 74 of the upper and lower rollers 66 and 70 mesh with the grooves 72 and lands 74 of the intermediate roller 68. The dimensions and configurations of all three rollers 66, 68 and 70 preferably are of the order of those mentioned heretofore and all three desirably are driven. The moistened paper web 50 is directed, as by an idler roller 76, into contact with the upper roller 66 so that it will have contact therewith through a considerable wrap angle, here shown as being greater than 180°, before passing through the nip between the upper and intermediate rollers 66 and 68. After passing through the nip between the upper and intermediate rollers 66 and 68 the paper web 50 continues in contact with the intermediate roller 68 through a wrap angle of about 180° before passing through the nip between the intermediate and lower rollers 68 and 70. The upper and intermediate rollers 66 and 68 preferably are adjusted to have an extent of intermesh less than that between the intermediate and lower rollers 68 and 70. For example, the upper and intermediate rollers 66 and 68 may be adjusted to have an extent of intermesh of the order of about 0.3 mm., while the intermediate and lower rollers 68 and 70 may be adjusted to have an extent of intermesh of the order of about 0.6 mm. Thus, the paper is grooved and stretched in successive stages, in its passage through the two nips between the three rollers 66, 68 and 70, which serves to minimize the afore-discussed impact effect of single-stage grooving and stretching apparatus. Since all three rollers intermesh there are no groove-registering problems, such as those attendant successive pairs of rollers.

Moreover, as described heretofore, all three of the grooving and stretching rollers 66, 68 and 70 preferably are heated to a temperature above 100° C. but not exceeding about 500° C. Before reaching the nip between the upper and intermediate rollers 66 and 68 the paper 50 is in contact, for an appreciable period of time, with the lands or ribs 74 of the heated upper roller 66 and during this period of time the paper is partially dried, probably to a greater extent in those longitudinal strips or zones 78 in contact with such lands. Consequently, those strips or zones 78 are partially rehardened and apparently not so greatly thinned or torn during their passage through the nip between the upper and intermediate rollers 66 and 68 as the zones in-between. Thus, in passage through such nip the zones 78 do not appear to be stretched and thinned as much as the side walls or flanks 80 of the grooves in the paper resulting from passage through such nip; nor stretched and thinned as much as the longitudinal strips or zones 82 in contact with the lands 74 of the intermediate roller 68. Of course, the degree or extent of such stretching or thinning can be controlled by adjusting the extent of intermesh between the upper and intermediate rollers 66 and 68.

The now partially grooved or crimped web 50 remains in contact with the lands 74 of the intermediate roller 68 through a wrap angle of about 180° before passage through the nip between the intermediate and lower rollers 68 and 70. During such period of contact the paper is dried still more, again probably to a greater extent in those narrow longitudinal zones or strips 82 in contact with the lands 74 of the intermediate roller 68, before the paper passes through the nip between the intermediate and lower rollers where the grooves in the paper 50 are deepened and consequently the paper is stretched still further, apparently more in the side walls or flanks 80 of the grooves in the paper than in the longitudinal strips or zones 78 and 82 which have contacted the lands 74 of the heated rollers 66 and 68 for an appreciable period of time.

It further will be noted that in its passage around the upper roller 66 the paper 50 is bent downward through an angle greater than 180°, while in its passage around the intermediate roller 68, the paper is bent in the opposite direction through an angle of substantially 180°. These reverse bending effects also serve to loosen and expose the fibers of the paper. Moreover, it has been found that grooving and stretching in successive stages by a three-roller train arrangement, such as shown in FIGS. 3 to 5, considerably reduces the afore-described impact effect attendant single-stage grooving and stretching and results in somewhat more uniform loosening and exposure of fibers. In fact, it has been found in actual practice that paper grooved in successive stages by apparatus of the type shown in FIGS. 3 to 5 is almost devoid of longitudinally-extending completely-unobstructed narrow openings or cracks. Instead, it is apparent from an inspection of FIG. 11, wherein the paper has been subjected only to a grooving and stretching treatment without perforation or knurling, that in those areas of the web which are laterally stretched, very few individual fibers are broken, severed, or torn apart. It appears that the thinning of the web in these areas is caused by the individual fibers sliding over one another so that the thinned areas almost always are provided with at least a thin veil of fibers instead of being completely open.

The thinned areas, although randomly located in the web 50, as shown in FIG. 11, correspond to similar areas in the untreated paper. The latter desirably has a weight of the order of about 32 to 35 grams per square meter and an average thickness of the order of 0.07 mm. It will be seen from an inspection of FIG. 10, however, that the preferred type of untreated paper to be used in practicing this invention has initial somewhat thicker and thinner portions which give rise to a cloudy appearance, the lighter areas as seen in FIG. 10 corresponding to the thicker areas of the paper. It is in the thinner areas of the raw paper that the process of this invention produces more stretching and resultingly more thinning of the web.

The more uniform loosening and exposure of the fibers resulting from the grooving and stretching treatment also is evident from an inspection of FIG. 12. In this connection the paper shown in FIGS. 11 and 12 has been grooved to an overall thickness of the order of 0.60 mm. with an average groove depth of the order of 0.46 mm.

During passage of the web through the grooving and stretching apparatus 64, the increased time period during which the web 50 is in contact with the lands or ribs 74 of the heated upper and intermediate rollers 66 and 68, due to the extent of the wrap angles thereabout, apparently partially dries and rehardens the narrow longitudinal zones or areas 78 and 82 of the paper to a greater extent than the flanks 80. Thus, during such passage the initial tensile strength of the web apparently is partially regained in the zones 78 and 82 to facilitate passage of the web through the remainder of the apparatus without breakage. Additionally, the entire web is partially dried to an extent sufficient to reduce the amount of subsequent drying time necessary to completely dry and reharden the web.

Further, in connection with the grooving and stretching apparatus shown in FIG. 3, it should be pointed out that although the apparatus lends itself to operation with the web arranged in a different path, i.e. first through the nip between rollers 68 and 70 and thence through the nip between rollers 66 and 68, the arrangement shown is preferred. The reason is that a certain amount of steam arises from those areas of the web in extended contact with the heated rollers and the emerging web should be located so that its undersurface will not be remoistened by such rising steam.

From the grooving and stretching apparatus 64 the grooved and stretched web 50 passes through a first drying apparatus, here shown as a heated metal plate 84 over which the web is slid. The heat in the first drying apparatus may be augmented by an infrared light arrangement 86 directed against the upper side of the web 50. Preferably the temperatures of the plate 84 and that imparted to the web 50 by the infrared light arrangement 86 are adjustable so that the web selectively can be only partly or completely dried in its passage through the first drying apparatus. From the first drying apparatus 84, 86 the web 50 passes through second deforming apparatus 88 where the web optionally may be treated with coarse or fine knurled rollers 90 selectively, as disclosed in my Pat. No. 2,995,481. After leaving the second deforming apparatus 88, the web 50 passes through a second selectively-operable and adjustable drying apparatus wherein, if need be, all of the excess water is completely removed and the web completely rehardened. This second drying apparatus may include a heated metal plate 92, similar to the afore-described plate 84, over which the web 50 is slid and an upper radiant panel heating arrangement 94 for directing heat against the upper surface of the web.

After being completely dried and rehardened, the web 50 may be passed through a cutting device 96 of known construction for dividing the web into several narrow strips that are wound onto separate spools or bobbins by the winding-up equipment 98.

Variations in the three-roll multi-stage grooving and stretching apparatus shown in FIG. 3 will be apparent, and can be used to achieve variations in desired characteristics of the finished product. For example, the direction of rotation of the rollers 66, 68 and 70 may be reversed and the web 50 threaded directly through the nip between the upper and lower rollers without any appreciable wrap angle about the upper roller 66, as shown in FIG. 6. This, of course, will result in no appreciable drying of the web before its passage through the nip between the upper and intermediate rollers 66 and 68. The web 50 next passes partly around the intermediate roller 68, through the nip between the intermediate and lower rollers, and thence through a wrap angle of about 180° around the lower roller. This arrangement, of course, results in partially drying and rehardening a web to some extent, by contact with the lower roller 70, after it has been completely grooved and stretched, as contrasted to the arrangement shown in FIG. 3 wherein no appreciable drying of the completely grooved and stretched web takes place in the grooving and stretching apparatus.

There is shown in FIG. 7 grooving and stretching apparatus identical to that shown in FIG. 6 but wherein the path of the completely grooved and stretched web 50 is changed to eliminate any wrap angle about the lower roller 70, and consequently any appreciable drying effect by the lower roller, after the web has been completely grooved and stretched. In this connection, it will be noted that the arrangement shown in FIG. 7 eliminates reverse bending of the web 50 in its passage through the grooving and stretching apparatus and can result, in the absence of appropriately-located guiding idler rollers, in a complete reversal of direction of travel of the web. Such reversal can be utilized, if desirable, by suitably rearranging the drying stations, to possibly shorten the overall length of the machine.

Likewise, multi-stage grooving and stretching apparatus of the type shown in FIG. 3, wherein at least one roller meshes with two others, lends itself, by the addition of another roller to the train, to three-stage grooving and stretching. Such an arrangement is shown in FIG. 8, wherein a fourth roller 100 is added to the stack of rollers 66, 68 and 70 and provides for progressive grooving and stretching by passage of the web 50 first through the nip between the top two rollers 100 and 66.

Four-stage grooving and stretching can also be accomplished with only four rollers, as shown in FIG. 9. In such apparatus the axes of the four rollers 102, 104, 106 and 108 are arranged at the corners of a quadrilateral and each roller meshes with two other rollers so that in effect there is an endless train of rollers. In this arrangement the web 50 passes first through the nip between the rollers 102 and 108, thence through the nip between the rollers 102 and 104, then through the nip between the rollers 104 and 106, and lastly through the nip between the rollers 106 and 108. It will be seen that this arrangement provides for wrap angles of considerable extent about at least three of the rollers, i.e. 102, 104 and 106 with the resulting possibility of more drying in the grooving and stretching apparatus.

It thus will be seen that the objects of this invention have been fully and effectively accomplished. It will be realized, however, that the embodiments disclosed are illustrative only of the principles of this invention and are susceptible of variation without departure from such principles.

I claim:
1. Apparatus for treating an elongated web of fibrous material to render the same particularly adapted to be gathered laterally and enclosed in a tubular wrapper to make a filter cord subdividable into effective filters for cigarettes, comprising:
   a pair of heated meshing grooving and stretching rollers provided with alternating narrow circumferential grooves and ribs whereby a web of moistened essentially inelastic fibrous material passed through the nip between said rollers is longitudinally grooved and laterally stretched to loosen and expose fibers in the web without substantial impairment of the transverse continuity of said web; and
   means for guiding a web emerging from said nip in contact with one of said rollers through an appreciable wrap angle to partially dry and reharden the web to preserve the structure imparted thereto by passage through said nip, comprising a third heated grooving and stretching roller meshing with the one roller to an extent greater than said pair for deepening the grooves in and further laterally stretching the web advancing in contact with said one roller through the nip between the latter and said third roller to loosen and expose more fibers in the web while preserving substantially unimpaired the transverse continuity of the web.

2. The apparatus defined in claim 1 including means for guiding a moistened web in contact with the other roller of the pair through an appreciable wrap angle before passing through the nip between the rollers of said pair to partially dry and reharden the web, mainly in those areas thereof in contact with the ribs of said other roller, before the web is longitudinally grooved and laterally stretched by passage through said nip.

3. The apparatus defined in claim 1 including means for guiding the grooved and stretched web emerging from the nip between the one and third rollers in contact with the third roller through an appreciable wrap angle to further partially dry and reharden the grooved and stretched web to preserve the structure imparted thereto by passage through the nips.

4. The apparatus defined in claim 3 in which the means for guiding the web in contact with the third roller comprises a fourth heated grooving and stretching roller meshing with the third roller to a greater extent than the one and third rollers for further deepening the grooves in and further laterally stretching the web advancing in contact with said third roller through the nip between said third and fourth rollers while preserving substantially unimpaired the transverse continuity of the web.

5. The apparatus defined in claim 4 in which the fourth roller meshes with the other roller of the pair to an extent greater than the third and fourth rollers for guiding the web emerging from the nip between the third and fourth rollers in contact with said fourth roller through an appreciable wrap angle and through the nip between said other and fourth rollers to further deepen the grooves in and further laterally stretch the web while maintaining substantially unimpaired the transverse continuity of the web.

References Cited

UNITED STATES PATENTS 1,667,292   4/1928   Lorenz _____ 156—90

BENJAMIN A. BORCHELT, Primary Examiner

C. T. JORDAN, Assistant Examiner

U.S. Cl. X.R.

156—594